United States Patent [19]

Dietrich et al.

[11] Patent Number: 4,560,496

[45] Date of Patent: Dec. 24, 1985

[54] LIQUID CRYSTALLINE NEMATIC COMPOUNDS

[76] Inventors: Demus Dietrich, Veilchenweg 22; Zaschke Horst, Platz d. Völkerfreundschaft 3; Altmann Heinz, Adolfstr. 3, all of 4020 Halle; Keil Michael, Nr. 32, 6521 Etzdorf, all of German Democratic Rep.

[21] Appl. No.: 654,814

[22] Filed: Sep. 26, 1984

[30] Foreign Application Priority Data

Sep. 30, 1983 [DD] German Democratic Rep. ... 255274

[51] Int. Cl.$^4$ .......................... G02F 1/13; C09K 3/34
[52] U.S. Cl. .......................... 252/299.61; 252/299.5; 252/299.63; 350/350 R
[58] Field of Search .................. 252/299.61, 299.63, 252/299.5; 350/350 R

[56] References Cited

U.S. PATENT DOCUMENTS

| | | | |
|---|---|---|---|
| 4,322,354 | 3/1982 | Sorkim | 252/299.61 |
| 4,323,471 | 4/1982 | Sethofer | 252/299.61 |
| 4,323,472 | 4/1982 | Sethofer | 252/299.61 |
| 4,344,856 | 8/1982 | Demus et al. | 252/299.61 |
| 4,364,838 | 12/1982 | Boller et al. | 252/299.61 |
| 4,486,332 | 12/1984 | Demus et al. | 252/299.61 |
| 4,490,277 | 12/1984 | Grebemkin et al. | 252/299.62 |

FOREIGN PATENT DOCUMENTS

| | | | |
|---|---|---|---|
| 54-151951 | 11/1979 | Japan | 252/299.63 |
| 56-120636 | 9/1981 | Japan | 252/299.63 |
| WO81/00853 | 4/1981 | PCT Int'l Appl. | 252/299.63 |
| 2067586 | 7/1981 | United Kingdom | 252/299.61 |
| 2138437 | 10/1984 | United Kingdom | 252/299.60 |

OTHER PUBLICATIONS

Blinov, L. M., Advances in Liquid Crystal Research and Applications, Bata, L. Ed., Akademiai Kiano, Budapest (1980), pp. 1083–1106.

Demus, D., et al., Mol. Cryst. Liq. Cryst., vol. 63, pp. 129–144 (1981).

Sorkin, H., Mol. Cryst. Liq. Cryst., vol. 56 (Letters), pp. 279–281 (1980).

Schubert, H. et al., Zeit. Chemie., vol. 12, No. 6, pp. 219–220 (1972).

*Primary Examiner*—Teddy S. Gron
*Attorney, Agent, or Firm*—Jordan and Hamburg

[57] ABSTRACT

A mixture consisting essentially of 5–40 mol-% of component B and the balance component A, component B consisting essentially of 5-n-propyl-2-(4-cyanophenyl)-1,3 dioxane and component A consisting essentially of 60–70 mol-% of 4-n-butylcyclohexanecarboxylic acid and 30–40 mol-% of 4-n-hexylcyclohexanecarboxylic acid, has superior liquid crystal properties for use in electrooptical devices.

6 Claims, No Drawings

LIQUID CRYSTALLINE NEMATIC COMPOUNDS

BACKGROUND OF THE INVENTION

The invention relates to nematic liquid crystalline compounds for electrooptical devices, including displays, for the modulation of transmitted or incident light as well as for the reproduction of numbers, symbols or images.

In order to be suitable for use in electrooptical displays the liquid crystals must satisfy a great number of demands most importantly and specifically low melting points, high clarification points, low threshold voltages and low viscosities. Pure substances hitherto do not even roughly meet these demands. Therefore, compositions comprising several substances; normally five to 10 substances, are used for displays. H. Kelker, R. Hatz, Handbook of Liquid Crystals, Verlag Chemie, Weinheim 1980

The use of a very large number of substances in making electrooptical displays requires much work in the synthesis of these compounds.

SUMMARY OF THE INVENTION

The object of the invention is to make compositions of nematic liquid crystals consisting of a few components only and having advantageous properties for use in electrooptical displays.

The task of the invention is to make mixtures of only three liquid crystalline compounds that have wide range of liquid crystalline existence and sufficiently low threshold voltages for their use in electrooptical displays.

It has been found that component A comprising 60 to 70 mol-% of 4-n-butylcyclohexanecarboxylic acid and 40 to 30 mol-% of 4-n-hexylcyclohexanecarboxylic acid by addition of 5 to 40 mol-% of 5-n-propyl-2-(4-cyanophenyl)-1,3-dioxane (component B) makes nematic compounds with a wide range of existence, sufficiently low threshold voltage, short starting times and high thermal as well as chemical stability values. It was surprising that these compounds do not form smectic phases, which makes them especially advantageous for the use in displays.

DETAILED DESCRIPTION OF PREFERRED EMBODIMENTS

The invention is further explained by way of examples.

The mixtures mentioned below are used in an electrooptical cell of the Schadt-Heffrich cell type (twisted nematic structure, TNP cell). The cell is made of two panes of glass fixed by means of spacers, so that they are to a distance of 7 to 20 μm from each other, their inner surfaces provided with zinc dioxide. The inner surface, further, is pretreated according to known methods, in such a way that the liquid crystal between the panes orients itself parallel to the panes. The preferential direction at the two panes, however, includes an angle of 90°, resulting in a twisted nematic structure that is arranged between crossed or parallel polarizers. By switching on or off the electrical field, significant changes in the light transmission of the cell are obtained.

The Schadt-Helfrich cell is filled with mixtures of the following composition:

Component A 4-n-butylcyclohexanecarboxylic acid: 65 mol-%,
4-n-hexylcyclohexanecarboxylic acid: 35 mol-%, Component B 5-n-propyl-2-(4-cyanophenyl)-1,3-dioxane

EXAMPLE 1

Component A 4-n-butylcyclohexanecarboxylic acid: 65 mol-%
4-n-hexylcyclohexanecarboxylic acid: 35 mol-%
Measuring frequency f=500 Hz, measuring temperature 25° C., layer thickness 10 μm
$U_o/V=10$
$t_{E50}(U=2\ U_o)$/ms: 115
$t_{E50}(U=5\ V)$/ms:
$t_{A50}$/ms: 130
clearing temperature 91° C.
melting temperature
The composition can be undercooled at choice.

EXAMPLE 2

Component A: 80 mol-%

Component B 5-n-propyl-2-(4-cyanophenyl)-1,3-dioxane: 20 mol-%
$U_o/V$ 2.3
$t_{E50}(U=2\ U_o)$/ms: 67
$t_{E50}(U=5\ V)$/ms: 56
$t_{A50}$/ms: 108
Clearing temperature 77°-78° C.
Melting temperature
The composition can be undercooled at choice.

EXAMPLE 3

Component A: 60 mol-%
Component B: 40 mol-%
$U_o/V$: 1.65
$t_{E50}(U=2\ U_o)$/ms: 54
$t_{E50}(U=5\ V)$ms: 26
$t_{A50}$/ms:
Clearing temperature: 59°-61° C.
Melting temperature: 46° C.

We claim:

1. A mixture consisting essentially of 5–40 mol-% of component B and the balance component A, component B consisting essentially of 5-n-propyl-2-(4-cyanophenyl)-1,3-dioxane and component A consisting essentially of 60–70 mol-% of 4-n-butylcyclohexanecarboxylic acid and 30–40 mol-% of 4-n-hexylcyclohexanecarboxylic acid.

2. The mixture according to claim 1 wherein the mixture consists essentially of 80 mol-% of component A and 20 mol-% of component B.

3. The mixture according to claim 1 wherein the mixture consists essentially of 60 mol-% of component A and 40 mol-% of component B.

4. An electrooptical device containing a mixture of liquid crystalline nematic compounds, the mixture being the mixture of claim 1.

5. An electrooptical device containing a mixture of liquid crystalline nematic compounds, the mixture being the mixture of claim 2.

6. An electrooptical device containing a mixture of liquid crystalline nematic compounds, the mixture being the mixture of claim 3.

* * * * *